United States Patent [19]

Hass

[11] Patent Number: 4,483,290

[45] Date of Patent: Nov. 20, 1984

[54] COMPRESSION-IGNITION INTERNAL COMBUSTION ENGINE

[75] Inventor: Eckhard Hass, Cologne, Fed. Rep. of Germany

[73] Assignee: Klöckner-Humboldt-Deutz AG, Cologne, Fed. Rep. of Germany

[21] Appl. No.: 363,270

[22] Filed: Mar. 29, 1982

Related U.S. Application Data

[63] Continuation of Ser. No. 130,240, Mar. 14, 1980, abandoned.

[30] Foreign Application Priority Data

Mar. 28, 1979 [DE] Fed. Rep. of Germany ........ 2912155

[51] Int. Cl.³ .............................................. F02B 19/16
[52] U.S. Cl. .................................... 123/284; 123/275; 123/261; 123/259
[58] Field of Search ............... 123/251, 259, 261, 275, 123/284, 286, 299

[56] References Cited

U.S. PATENT DOCUMENTS

| 2,932,289 | 4/1960 | Witzky . | |
|---|---|---|---|
| 3,776,212 | 12/1973 | Karlowitz . | |
| 3,980,057 | 9/1976 | Sanda et al. . | |
| 4,040,393 | 8/1977 | Decker et al. . | |
| 4,116,234 | 9/1978 | Yanagihara et al. . | |
| 4,162,664 | 7/1979 | Fleming . | |
| 4,186,692 | 2/1980 | Kawamura et al. | 123/284 |
| 4,284,043 | 8/1981 | Happel | 123/299 |

FOREIGN PATENT DOCUMENTS

| 0213660 | 7/1960 | Austria | 123/275 |
|---|---|---|---|
| 0659160 | 3/1938 | Fed. Rep. of Germany . | |
| 0413122 | 7/1934 | United Kingdom | 123/299 |

Primary Examiner—Parshotam S. Lall
Attorney, Agent, or Firm—Watson, Cole, Grindle & Watson

[57] ABSTRACT

A compression-ignition internal combustion engine has a secondary combustion chamber in communication with the main combustion chamber via an injection passage extending from one end of the secondary chamber, and a fuel injection nozzle for injecting fuel into the secondary chamber from an opposite end thereof. The injection nozzle includes a pair of fuel discharge orifices having axes lying in mutually parallel relationship and are disposed for essentially bisecting the secondary chamber, and the injection passage has a length smaller than the diameter thereof. Thus, the development of any strong rotary currents in the secondary chamber are substantially avoided and high turbulence currents are capable of being developed in the secondary chamber which substantially prevent the injected fuel from precipitating as a coating on the wall of the secondary chamber and which permit the formation of a fuel-air mixture adjacent such wall so as to effect a reduction in hydrocarbons, oxides of nitrogen and other impurities contained in the exhaust from the engine.

1 Claim, 1 Drawing Figure

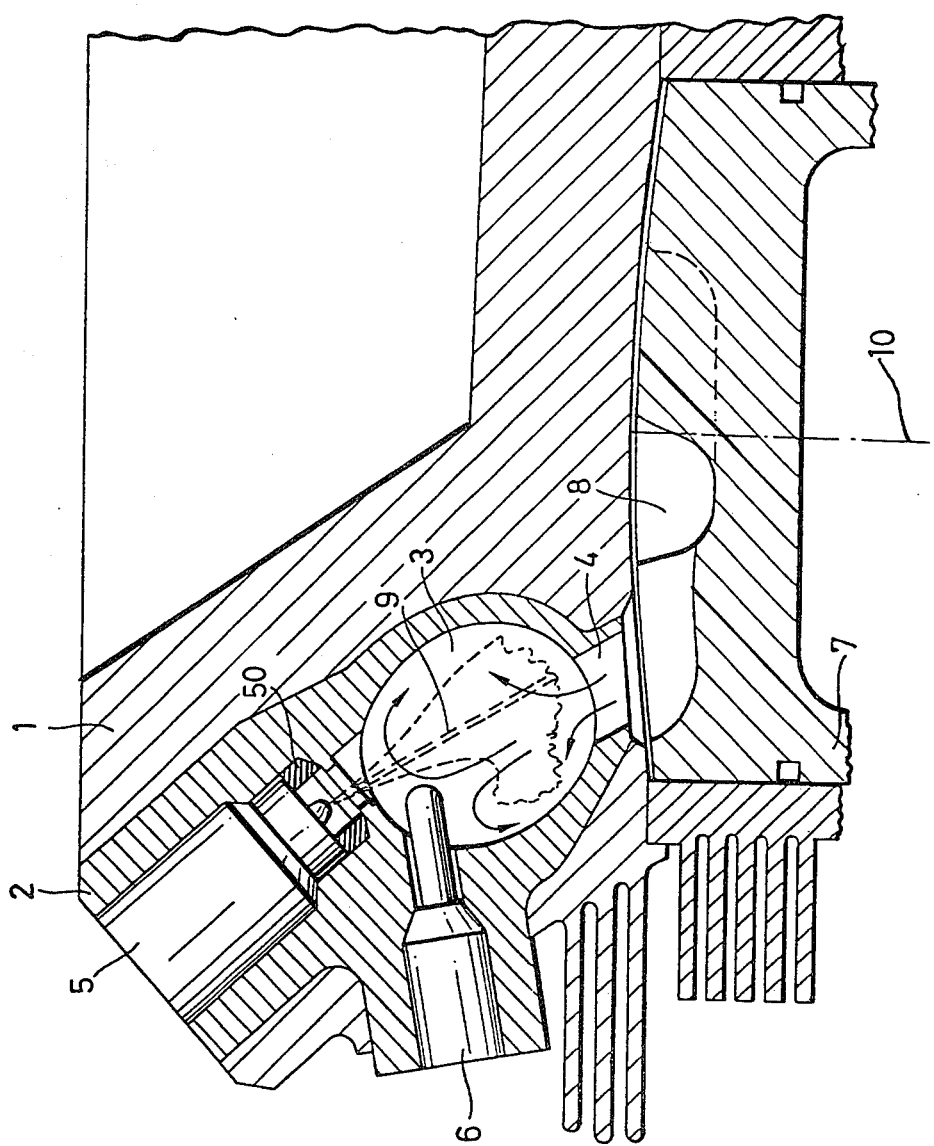

COMPRESSION-IGNITION INTERNAL COMBUSTION ENGINE

This is a continuation of application Ser. No. 130,240 filed Mar. 14, 1980 now abandoned.

BACKGROUND OF THE INVENTION

1. Field of the Invention

This invention relates generally to a compression-ignition internal combustion engine with a cylinder head containing an approximately spherical secondary combustion chamber in communication via an injection passage with the main combustion chamber in the cylinder, a fuel injection nozzle being provided essentially diametrically opposite the mouth of the injection passage in the secondary chamber.

2. Description of the Prior Art

German Pat. No. 659,160 discloses an internal combustion engine having a turbulence chamber. In such engine, the fuel is injected through a so-called pivot nozzle into the turbulence chamber in such a manner that a coating of the liquid fuel develops on the wall of the chamber near the mouth of the injection passage leading into the turbulence chamber. And, because the injection passage is relatively long, a strong twisting flow of air develops in the turbulence chamber which must be impinged by the jets of fuel. The fuel particles are carried along by the twisting flow and rebound from the wall of the turbulence chamber where rapid mixing and combustion take place, as a result of which the combustion gases include a high concentration of nitrous oxides. The turbulence chamber wall which is coated with the liquid fuel, especially in a partial load area or during the operation of a cold engine, further results in a high concentration of hydrocarbons in the exhaust gas.

An internal combustion engine of the aforedescribed type is therefore only conditionally suited for operation during peak motor vehicle driving periods of today because of the high concentration of harmful impurities in the exhaust gas. As is known, many countries have set maximum permissible limits for the emission of harmful impurities from the exhaust gas of motor vehicles.

SUMMARY OF THE INVENTION

It is the object of the present invention to provide a compression-ignition internal combustion engine generally of the aforedescribed type but which effects a reduction in hydrocarbons, oxides of nitrogen and other impurities contained in the exhaust from the engine, in an efficient, simple and highly economical manner.

In accordance with the present invention, the fuel injection nozzle has a pair of fuel discharge orifices with the axes thereof lying in mutually parallel relationship and being disposed for essentially bisecting the secondary combustion chamber, and the length of the injection passage is made smaller than its diameter. Such an arrangement substantially avoids the development of any strong rotary currents in the secondary chamber, but induces the development of high turbulence currents in the secondary chamber which substantially prevent the injected fuel from precipitating as a coating on the wall of the secondary chamber. By the prevention of such a wall coating and by the formation instead of a fuel-air mixture adjacent the wall of the secondary chamber, the invention is capable of effecting a reduction in hydrocarbons contained in the exhaust from the engine. Likewise, the distribution of air in the mixture is greatly improved by the jetstream formation of the injected fuel and the direction of the jetstream relative to the air turbulences, which results in a stronger exchange of impulses with the combustion air so that a more complete utilization of the air is made possible whereupon the exhaust gas contains lower black smoke and carbon monoxide values. A high carbon monoxide concentration in the exhaust gas, typically present during operation of a cold engine or a partially loaded secondary combustion area with a low twist turbulence, is substantially reduced by the high turbulence current produced in the secondary combustion chamber according to the invention.

An increase in such turbulence is achieved in accordance with a further feature of the invention by disposing the injection passage essentially radially into the secondary combustion chamber.

Because of the good combustion characteristics and the low emission of harmful substances during operation of the present engine, the volume of the secondary combustion chamber may be lowered to values between 25% and 35% of the total compression volume of the main combustion chamber. Moreover, such an engine exhibits very good starting characterisics, so that the compression ratio can be lowered to values of compression-ignition direct injection internal combustion engines in the order of magnitude of $\epsilon = 16$ to 18.

Whenever the ratio of length to diameter of the injection passage is selected at, for example, 2:3 and whenever the cross-sectional area of the injection passage is selected at about 1% of the total piston surface, as further features of the present invention, a further boost of the turbulence and a further drop of the direct rotary current in the secondary combustion chamber, will be effected. As a result and because of quite short ignition delays, very low nitrous oxide emissions will occur during operation of the present arrangement even in the case of an optimal consumptive conveying start. Likewise, due to the enlarged cross-section of the injection passage, the temperature of the elements of the secondary combustion chamber will be lessened. Thus, the invention is particularly well suited for adoption in air-cooled internal combustion engines. A further advantage of the invention is that the spark plug provided for starting must be used only during clearly lower ambient temperatures as compared to those required for prior art constructions.

Further features of the invention include spacing the axes of the discharge orifices from the central axis of the secondary chamber by a distance equal to about one-tenth the diameter of the secondary chamber, and include spacing the geometrical point of impact of the orifice axes on the wall of the secondary chamber inwardly of the mouth edge of the injection passage a distance equal to about one-tenth the diameter of the secondary chamber. Thus, with the axes of the secondary chamber and of the injection passage lying at an angle to axis 10, the point of impact is disposed closer to the central axis of the piston then the central axis of the passage into the secondary combustion chamber. As a result, the jets of fuel are deflected such that, during cold engine operation, the not yet atomized core of the jet may enter the injection passage as well as partly enter the main combustion chamber of the piston. Thus, the geometrically free length of the jet is raised to about 1.75 times the diameter of the secondary combustion chamber, so that the pulse exchange of the combustion chamber air with the fuel is improved further as a result of which the harmful impurities in the exhaust during engine operation, are reduced to a minimum. Thus, the engine according to the invention is suitable for use in motor vehicles operating during peak hours and will comply with those emission standards set in most countries.

DETAILED DESCRIPTION OF THE INVENTION

In the single drawing FIGURE, which is a schematic cross-section taken through a cylinder head of an air-cooled compression-ignition internal combustion engine, cylinder head 1 contains an insert 2 which includes a secondary combustion chamber 3, an injection passage 4 and bores for the reception of a fuel injection nozzle 5 and a spark plug 6.

The engine includes a piston 7 operating in a cylinder which defines a main combustion chamber including a cavity 8 which may accommodate about 70% of the entire compression volume.

Nozzle 5 is supported within insert 2 axially relative to a heat insulator plate 50 so that the region of the nozzle orifices is protected against heat, whereby the nozzle will remain cool and any carbonization thereof is substantially avoided. The injection nozzle has a pair of fuel discharge orifices of about 0.3 to 0.45 mm diameter. The order of magnitude of the orifice size is in the area of fuel injection nozzles which are used in compression-ignition direct injection internal combustion engines of the same cylinder output. The geometrical axes 9 of the discharge orifices lie in mutually parallel relationship and are directed through the secondary combustion chamber such that they are spaced from the central axis of the secondary chamber by a distance equal to about one-tenth the diameter of the secondary combustion chamber and therefore strike the wall of the secondary combustion chamber at a distance of about one-tenth the diameter of the secondary chamber inwardly of the mouth edge of the injection passage, so that the impact point is disposed closer to central axis 10 of the piston than the central axis of the injection passage in the secondary combustion chamber.

Injection passage 4 has a diameter/length ratio of about 3:2 and, the central axis of the injection passage is essentially radially disposed to the secondary combustion chamber, rather than tangentially, so that no high rotary current develops in the inflowing air in the combustion chamber, but rather an overwhelmingly turbulent current. Such a turbulent current promotes the development of the fuel-air mixture, and prevents the fuel jets from being able to follow the jet axes of the nozzle orifices and therefore from strking the wall of the secondary chamber. Instead, the turbulent flow produces an air-distributed mixture formation away from the wall of the secondary chamber thus producing a stronger pulse exchange with the inflowing combustion air. This leads to a more complete utilization of the air, so that the exhaust gas will contain a minimum amount of nitrous oxides which in the entire performance graph lies below 450 ppm and the exhaust gas will contain a very small amount of hydrocarbons since no wall coating of the liquid fuel takes place within the secondary combustion chamber.

Also, the hydrocarbon concentration in the mixed gas does not increase in the partial load area or during operation of a cold engine, since as a result of the present arrangement, even the smallest air current of the combustion air will suffice for avoiding a wall coating of the liquid fuel, since even small deflections of the jets of fuel by the combustion air will guide the latter into injection passage 4. The free length of the jets therefore increases from about 1.25 times the diameter of the secondary combustion chamber to about 1.75 times such diameter.

Obviously, many modifications and variations of the present invention are made possible in the light of the above teachings. It is therefore to be understood that within the scope of the appended claims, the invention may be practiced otherwise than as specifically described.

What is claimed is:

1. An air-compression, auto-ignition cylinder combustion engine with an approximately spherical secondary combustion chamber within the cylinder head, having only one injection channel by means of which it is in communication with one main combustion chamber within the cylinder, while being otherwise closed, said injection channel opening essentially centrally into the secondary chamber and opening into the main combustion chamber in the outer radial area thereof, and having an injection nozzle arranged essentially diametrically opposite to the opening of the injection channel into the secondary combustion chamber, the improvement wherein the injection nozzle is designed as double-jet nozzle, the axes of the two holes thereof being arranged parallel to each other in such a manner that they pass the center of the secondary combustion chamber at a distance of 0.1 times the diameter of said secondary combustion chamber, and the two axes of the holes of the injection nozzle meet the wall of the secondary combustion chamber at a distance of about 0.1 times the diameter of the secondary combustion chamber from the opening of the injection channel, the point of impact being located closer to the longitudinal axis of the piston than the opening of the injection channel in the secondary chamber the area of the cross-section of the injection channel being about 1% of the total piston surface, the volume of the secondary combustion chamber being approximately between 25% and 35% of the total compression volume, and the length of the injection channel being smaller than its diameter, being designed on a scale of about 2:3, whereby the development of any strong rotary currents in said secondary chamber are substantially avoided, and whereby high turbulence currents are developed in said secondary chamber which substantially prevent the injected fuel from precipitating as a coating on the wall of said secondary chamber and which permit the formation of a fuel-air mixture adjacent said wall to thereby effect a reduction in hydrocarbons, oxides of nitrogen and other impurities contained in the exhaust from the engine.

* * * * *